United States Patent
Polland (10) Patent No.: US 8,396,084 B2
(45) Date of Patent: Mar. 12, 2013

(54) POINT-TO-MULTIPOINT DATA COMMUNICATIONS WITH CHANNEL ASSOCIATED SIGNALING

(75) Inventor: Joe Polland, Eden Prairie, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 13/412,067

(22) Filed: Mar. 5, 2012

(65) Prior Publication Data

US 2012/0163397 A1 Jun. 28, 2012

Related U.S. Application Data (63) Continuation of application No. 11/566,493, filed on Dec. 4, 2006, now Pat. No. 8,208,496.

(51) Int. Cl.
*H04J 3/00* (2006.01)

(52) U.S. Cl. ........ 370/498; 370/336; 370/337; 370/338; 370/400; 370/410; 370/420; 370/421; 370/432; 370/458; 370/468; 370/473; 370/485; 370/486; 370/487; 370/503; 370/537

(58) Field of Classification Search .................. None
See application file for complete search history.

(56) References Cited

U.S. PATENT DOCUMENTS

| | | | |
|---|---|---|---|
| 4,530,093 A | 7/1985 | Akram | |
| 5,452,306 A | 9/1995 | Turudic et al. | |
| 5,506,956 A | 4/1996 | Cohen | |
| 5,526,344 A | 6/1996 | Diaz et al. | |
| 5,768,278 A | 6/1998 | Virdee et al. | |
| 5,771,236 A | 6/1998 | Sansom et al. | |
| 5,812,786 A | 9/1998 | Seaholtz et al. | |
| 5,881,059 A | 3/1999 | Deschaine | |
| 5,953,318 A | 9/1999 | Nattkemper et al. | |
| 6,266,349 B1 | 7/2001 | Fukui et al. | |
| 6,320,876 B1 | 11/2001 | Virdee et al. | |
| 6,781,985 B1 | 8/2004 | Feder et al. | |
| 6,954,463 B1 | 10/2005 | Ma et al. | |
| 6,963,561 B1 | 11/2005 | Lahat | |
| 7,054,377 B1 | 5/2006 | Betts | |
| 7,088,742 B2 | 8/2006 | Oliver et al. | |
| 2002/0040381 A1 | 4/2002 | Steiger et al. | |

(Continued)

FOREIGN PATENT DOCUMENTS

| | | |
|---|---|---|
| EP | 0760563 | 3/1997 |
| JP | 09139723 | 5/1997 |

OTHER PUBLICATIONS

Mexican Institute of Intellectual Property (IMPI), "MX Final Office Action", mailed: May 18, 2012, Published in: MX.

(Continued)

*Primary Examiner* — John Blanton
*Assistant Examiner* — Aixa A Guadalupe
(74) *Attorney, Agent, or Firm* — Fogg & Powers LLC (57) ABSTRACT

Systems and methods for point-to-multipoint communications with CAS are provided. In one embodiment, a line unit comprises: an interface to communicate with a node using a first frame structure comprising timeslots, the frame structure transporting signaling bits in an x'th timeslot; the unit coupled another line unit via a communication link, wherein the other unit communicates with another network node using a second frame structure comprising timeslots, the second frame structure transporting signaling bits via its x'th timeslot. Payload timeslots for a first frame received from the other line unit are mapped from the second frame structure to payload timeslots of a second frame using the first frame structure and transmitted via the interface. The x'th timeslot for each of the first and second frame structures are formatted in a multiframe structure comprising a schedule of signaling bit locations allocated to signaling bits corresponding to a designated payload timeslot.

20 Claims, 6 Drawing Sheets

U.S. PATENT DOCUMENTS

| | | |
|---|---|---|
| 2003/0058847 A1 | 3/2003 | Pike |
| 2003/0123487 A1 | 7/2003 | Blackwell et al. |
| 2004/0090985 A1 | 5/2004 | Burkle et al. |
| 2004/0213170 A1 | 10/2004 | Bremer |
| 2004/0264683 A1 | 12/2004 | Bye |
| 2005/0100337 A1 | 5/2005 | DeCusatis et al. |
| 2005/0210157 A1 | 9/2005 | Sakoda |
| 2006/0233188 A1 | 10/2006 | Oliver et al. |
| 2008/0130688 A1 | 6/2008 | Polland |

OTHER PUBLICATIONS

U.S. Patent and Trademark Office, "Notice of Allowance", "U.S. Appl. No. 12/468,562", Oct. 1, 2012, pp. 1-8.

Rup et al, "SHDSL Technology Complementing Other Transport Technologies", "EUROCON 2003. Computer as a Tool. The IEEE Region 8", Sep. 22, 2003, pp. 229-232, vol. 1, Publisher: IEEE, Published in: Piscataway, NJ.

U.S. Patent and Trademark Office, "Final Office Action", "U.S. Appl. No. 12/468,562", Jul. 17, 2012.

International Searching Authority, "International Search Report" from Foreign Counterpart of U.S. Appl. No. 12/468,562, Mailed Jan. 15, 2010, Published in: WO.

U.S. Patent and Trademark Office, "Office Action", "U.S. Appl. No. 12/468,562", Jan. 6, 2012.

State Service of Intellectual Property of Ukraine, "Decision on the Grant of a Patent for an Invention" from Foreign Counterpart of U.S. Appl. No. 12/468,562, Jun. 21, 2012, pp. 1-4, Published in: UA.

POINT-TO-MULTIPOINT DATA COMMUNICATIONS WITH CHANNEL ASSOCIATED SIGNALING

CROSS-REFERENCE TO RELATED CASES

This application is a continuation of and claims benefit of application Ser. No. 11/566,493 filed on Dec. 4, 2006, entitled "POINT-TO-MULTIPOINT DATA COMMUNICATIONS WITH CHANNEL ASSOCIATED SIGNALING" (currently pending), which is incorporated herein by reference and to which this application claims priority.

BACKGROUND

Digital Subscriber Line (DSL) networks, such as G.SHDSL, allow flexible, high-speed data transmission rates over standard copper interfaces. Normally a single line unit at a central office location is connected to a single remote unit using one or two G.SHDSL pairs for increased bandwidth. A very useful enhancement to this standard configuration is point-to-multipoint, where a single line unit at a central office is connected to two remote units, using a single G.SHDSL pair to each remote unit. A point-to-multipoint network implementation provides cost advantages over point to point because it eliminates the need to install separate DSL line units at a central office for each remote unit served by the central office. Further, point-to-multipoint allows service providers to offer fractional G.703/E1 lines to customers who may not require the entire bandwidth capacity provided by a full G.703/E1 line.

One useful feature of a full G.703/E1 interface line is the Channel Associated Signaling (CAS) signaling bits carried in timeslot 16 of each E1 frame. CAS signaling bits use routing information to direct voice/data payloads carried by a G.703/E1 interface line to its destination. Because G.703/E1 signal channels are dedicated to single interface applications, one problem with point-to-multipoint applications in the art today is that there is no means for communicating CAS signaling bits between a central office line unit and the line units of one or more remote units having fractional G.703/E1 lines that share the central office line unit's single G.703/E1 interface.

For the reasons stated above and for other reasons stated below which will become apparent to those skilled in the art upon reading and understanding the present specification, there is a need in the art for improved systems and methods for point-to-multipoint data communications with CAS signaling.

SUMMARY

The Embodiments of the present invention provide methods and systems for point-to-multipoint data communications with CAS signaling, and will be understood by reading and studying the following specification.

In one embodiment, a line unit comprises: a first network interface to communicate with a first network node using a first frame structure comprising a plurality of timeslots, the first frame structure transporting signaling bits in an x'th timeslot reserved for signaling; the first line unit further coupled to at least one other line unit via a communication link, wherein the at least one other second line unit is configured to communicate with a second network node using a second frame structure comprising a plurality of timeslots, the second frame structure transporting signaling bits via its x'th timeslot; wherein payload timeslots for a first frame received from the at least one other line unit are mapped from the second frame structure to payload timeslots of a second frame using the first frame structure and transmitted via the first network interface; wherein the x'th timeslot for each of the first frame structure and the second frame structure is formatted in a multiframe structure, wherein the multiframe structure comprises a schedule of signaling bit locations each allocated to signaling bits corresponding to a designated payload timeslot; and wherein when the first line unit receives from the at least one other line unit a first set of signaling bits for a first payload timeslot within the second frame structure, based on where in the first frame structure the first payload timeslot is mapped to a second payload timeslot, the first line unit schedules retransmission of the first set of signaling bits for the x'th timeslot of a frame scheduled for signaling bit locations corresponding to the second payload timeslot as scheduled according to the multiframe structure.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings, which form a part hereof, and in which is shown by way of illustrating specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention allow multiple remote units to share a single G.703/E1 interface of a central office while providing CAS signaling with the multiple remote units.

Figure 1:
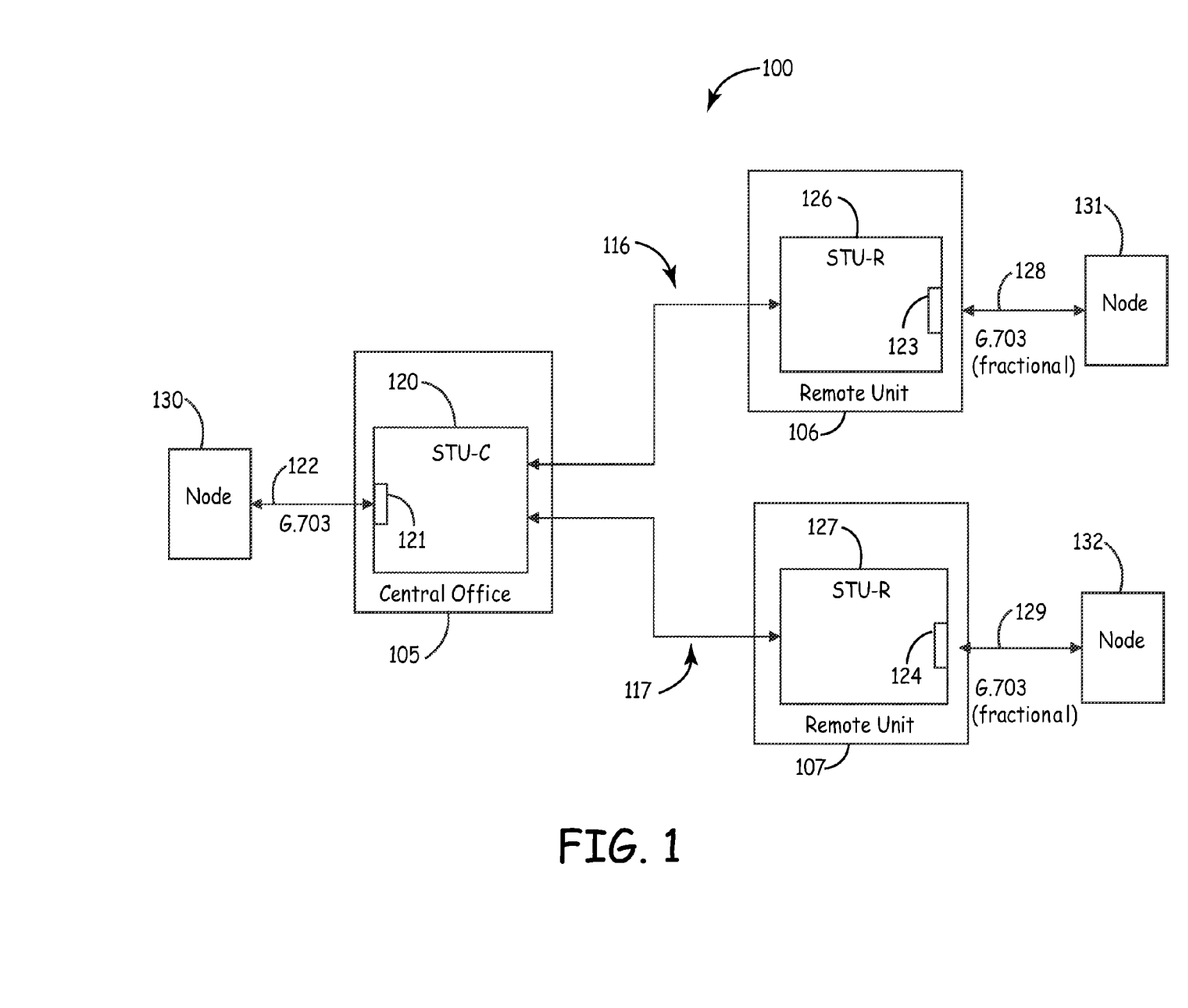
FIG. 1 is a block diagram illustrating a communication network of one embodiment of the present invention.

FIG. 1 shows a communications network 100 of one embodiment of the present invention. The network 100 includes a central office 105 in communication with a first remote unit 106 and in communication with a second remote unit 107. The central office 105 includes a DSL line unit (STU-C) 120 that is coupled to communicate with a DSL line unit (STU-R) 126 located at the remote unit 106 over a first G.SHDSL loop 116. DSL line unit (STU-C) 120 is also coupled to communicate with a DSL line unit (STU-R) 127 located at the remote unit 107 over a second G.SHDSL loop 117.

In the embodiment shown in FIG. 1, STU-C 120 includes a single G.703/E1 interface 121 coupled to communicate with a network node (130) in the upstream direction through G.703/E1 communication link 122. STU-R 126 and STU-R 127 each include a G.703/E1 interface (shown as 123 and 124, respectively) coupled to communicate via a fractional G.703/E1 line with respective network nodes 131 and 132 in the downstream direction through G.703/E1 communication links 128 and 129, respectively.

Embodiments of the present invention enable G.703/E1 timeslots and resources of STU-C 120 to be shared between the two remote STU-R's 126 and 127. When viewed from node 130 looking into the G.703/E1 interface 121 of STU-C 120, the G.703/E1 interface 123 of STU-R 126 and the G.703/E1 interface 124 of STU-R 127 are not individually visible, but appear as a single G.703/E1 interface. With embodiments of the present invention, each of STU-R 126's and STU-R 127's respective G.703/E1 interfaces are allocated a proportion of STU-C 120's G.703/E1 interface, up to 100% of the bandwidth capacity of STU-C 120's G.703/E1 interface. In addition, timeslot (TS) 16, the CAS signaling channel, is mapped between the G.703/E1 interfaces of STU-R 126 and STU-R 127.

As would be appreciated by one of ordinary skill in the art upon reading this specification, a standard E1 frame consists of up to 32 time slots. Timeslot 0 is reserved for carrying framing information, optional cyclic redundancy check bits, and other overhead related information. Timeslot 16 is reserved to carry CAS signaling bits. Minus these two reserved time slots, a full E1 frame can carry up to 30 timeslots of user-data. Time slots used to carry user-data are hereinafter referred to as "user-data timeslots". The 30 user-data timeslots available in a full E1 frame (i.e., timeslots 1-15 and 17 to 31 of the E1 frame) are also frequently referred to as telephone channels 1 to 30. Point-to-multipoint with CAS is accomplished by embodiments of the present invention by applying timeslot remapping and CAS signaling bits remapping.

As used in this specification, when a pair of timeslots are said to be "mapped to" or "mapped with" each other, it means that data received by one of the timeslot pairs via a G.703/E1 interface is communicated to the other of the pairs for transmission via another G.703/E1 interface. For example, assuming that an STU-C's timeslot 17 is mapped with an STU-R's timeslot 1, then any data received by the STU-C's E1 interface on timeslot 17 is retransmitted via the STU-R's G.703/E1 interface on timeslot 1. In the same way, any data received by the STU-R's E1 interface on timeslot 1 is retransmitted via the STU-C's G.703/E1 interface on timeslot 17.

Figure 2:
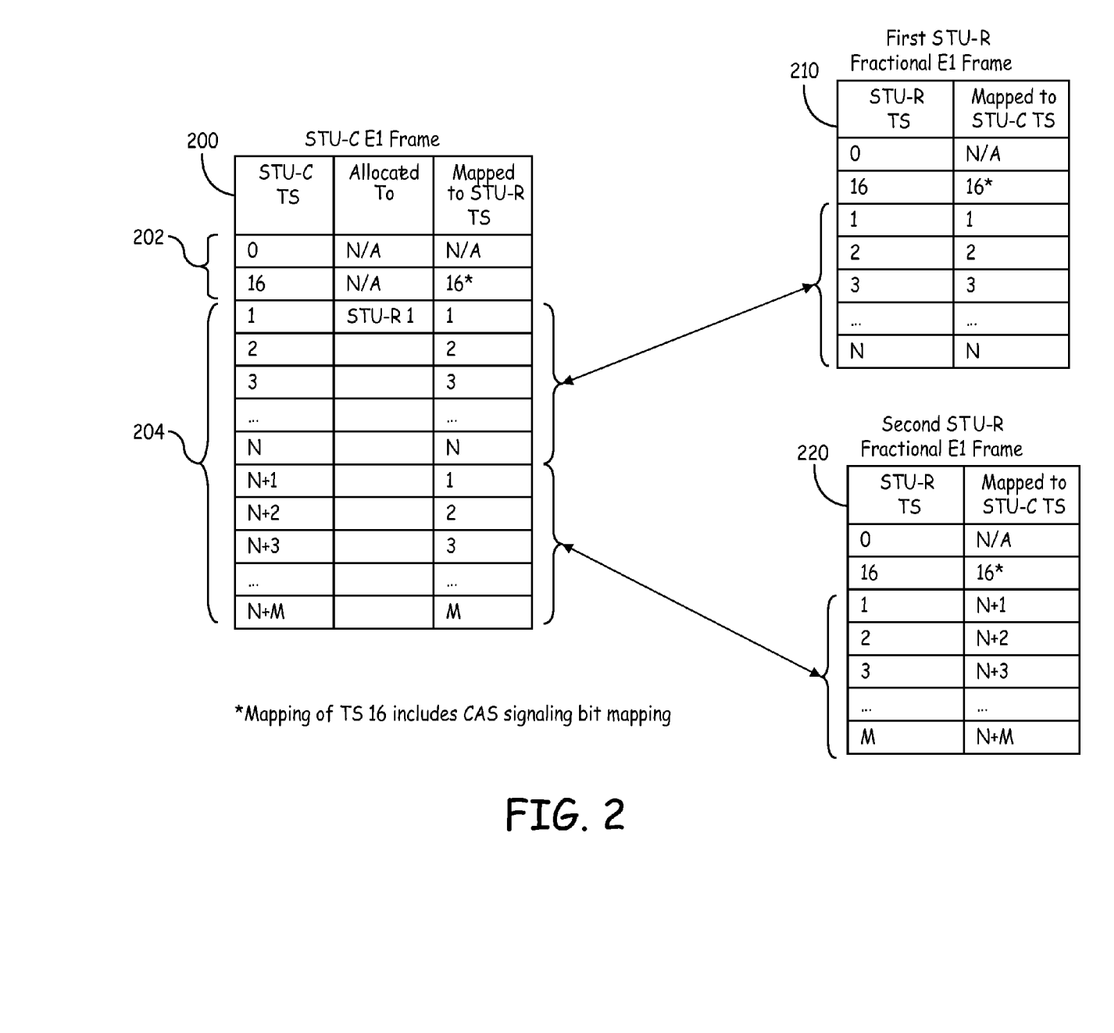
FIG. 2 is a diagram illustrating timeslot mapping for a communication network of one embodiment of the present invention.

FIG. 2 is a chart illustrating timeslot mapping of one embodiment of the present invention. In one embodiment, FIG. 2 illustrates timeslot mapping for a communications network such as network 100, where a first STU-R and a second STU-R share the bandwidth provided via an STU-C.

As illustrated in FIG. 2, an E1 frame 200 carried by STU-C includes two reserved timeslots (i.e., non-user-data timeslots) at timeslot 0 and timeslot 16 (shown at 202). E1 frame 200 also includes up to 30 user-data timeslots (shown at 204) which occupy timeslot 1 to timeslot 15 and timeslot 17 to timeslot 31, as needed.

Bandwidth provided by the STU-C that is allocated to a first fractional E1 frame 210 of the first STU-R is allocated the first N user-data timeslots on E1 frame 200. As illustrated, the first N user-data timeslots of E1 frame 200 are mapped with the first N user-data timeslots of the first fractional E1 frame 210. Timeslot 16 of the STU-C frame 200 is also mapped to timeslot 16 of the fractional E1 frame 210, however the STU-C also further perform signaling bit remapping for timeslot 16, as described in greater detail below.

Bandwidth provided by the STU-C that is allocated to a second fractional E1 frame 220 of the second STU-R is allocated the next M user-data timeslots on E1 frame 200 that are appended to the N user-data timeslots already allocated to the first fractional E1 frame 210. The M user-data timeslots allocated to the second STU-R's fractional E1 frame 220 are mapped to the first M user-data timeslots of the second fractional E1 frame 220. Timeslot 16 of the STU-C frame 200 is also mapped to timeslot 16 of the fractional E1 frame 210, however the STU-C also further perform signaling bit remapping for timeslot 16, as described in greater detail below.

To illustrate timeslot mapping more specifically, when N+M is less than or equal to 15, the timeslots of the first fractional E1 frame 210 map to timeslots 1 to N on E1 frame 200, while timeslots of the second fractional E1 frame 220 map to timeslots N+1 to N+M on the E1 frame 200.

When N is greater than 15, the timeslots of the first fractional E1 frame 210 map to timeslots 1 to 15 and 17 to N on E1 frame 200, while timeslots of the second fractional E1 frame 220 map to timeslots N+2 to N+M+1 on the E1 frame 200.

When N is less than or equal to 15, and N+M is greater than 15, the timeslots of the first fractional E1 frame 210 map to timeslots 1 to N on E1 frame 200, while timeslots of the second fractional E1 frame 220 map to timeslots N+1 to 15, and timeslots 17 to N+M+1 on the E1 frame 200.

With respect to any of the above three cases, timeslot 16 for the STU-C is always mapped to timeslot 16 of both the first and second STU-R based on the CAS signaling bit remapping described in greater detail below.

In addition to timeslot remapping, embodiments of the present invention provide CAS signaling bit remapping to enable the communication of signaling bits between multiple remote units and the central office. As previously mentioned, time slot 16 of a standard E1 frame is reserved to carry CAS signaling bits.

Figure 3A:
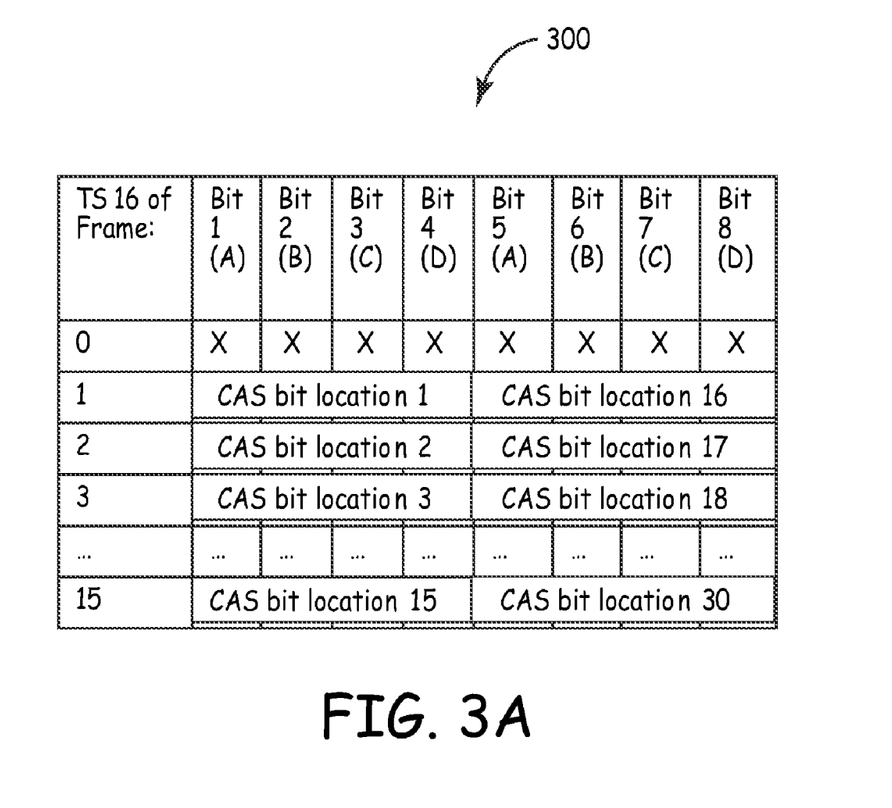
FIGS. 3A and 3B are diagrams illustrating CAS signaling bit mapping for a communication network of one embodiment of the present invention.

FIG. 3A is a chart illustrating the location of CAS signaling bits within each timeslot 16 of frames 0 to 15 of an G.703/E1 interface line. Generally, time slot 16 across Frames 0 to 15 is structured to include up to four signaling bits (shown as A, B, C, D) to carry routing information for up to 30 user-data timeslots of an E1 frame. As illustrated in FIG. 3A, timeslot 16 for each frame of E1 data can include signaling bits for up to two timeslots in what are referred to in this application as "CAS bit locations" within timeslot 16. The CAS signaling bits for up to the first 15 user-data timeslots are stored in CAS bit locations 1 to 15, which as shown in FIG. 3A, occupy the first four bits of timeslot 16 in frames 1 to 15. Assuming the E1 line is configured to carry user-data in more than the first 15 user-data timeslots, CAS signaling bits for up to 15 additional user-data timeslots are stored in CAS bit locations 16 to 30, which occupy the second four bits of timeslot 16 in frames 1 to 15.

Figure 3B:
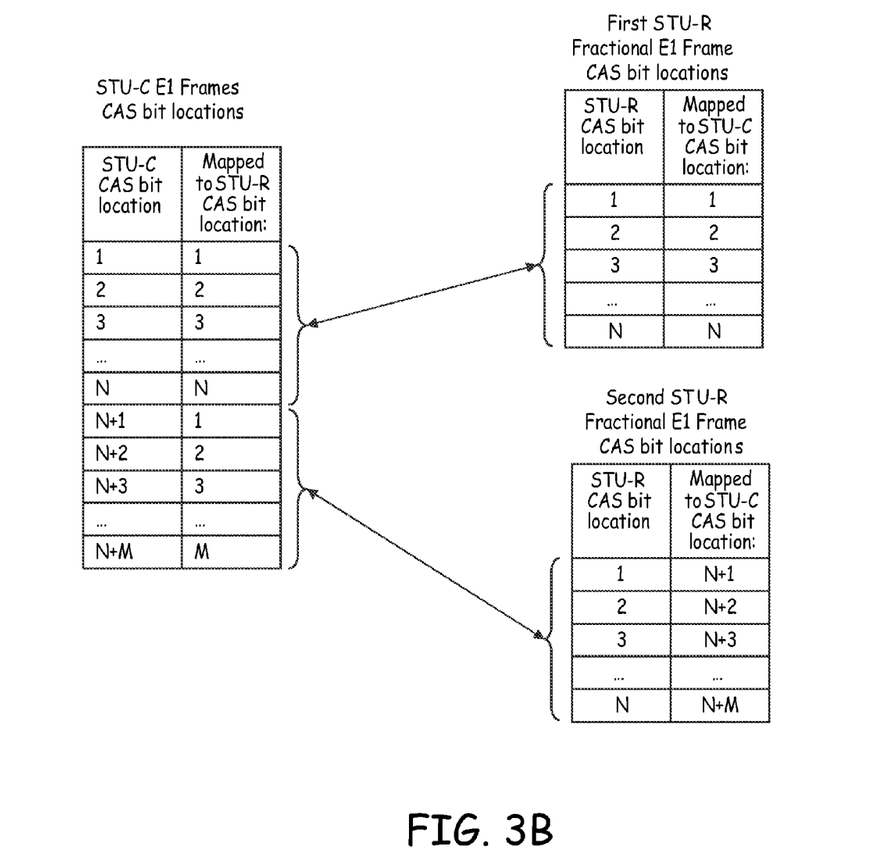

Shown in FIG. 3B, embodiments of the present invention map CAS signaling between an STU-C and corresponding CAS bit locations for a first STU-R and a second STU-R, based on the STU-C timeslots mapped with the first STU-R and the second STU-R. As shown in FIG. 3B, the concept behind mapping CAS bit locations is comparable to the mapping of user-data timeslots, as described with respect to FIG.

2. Assuming that the first N user-data timeslots of an STU-C G.703/E1 interface are mapped with a first fractional E1 interface of a first STU-R, the CAS signaling bits associated with those N STU-C user-data timeslots would be located in CAS bit locations 1 to N. Therefore, the first N CAS bit locations for the STU-C interface are mapped to the first N CAS bit locations for the first fractional E1 interface. Assuming that the next M user-data timeslots of the STU-C are mapped with a second fractional E1 interface of a second STU-R, the CAS signaling bits associated with those M STU-C user-data timeslots would be located in CAS bit locations N+1 to M. Therefore, the next M CAS bit locations for the STU-C E1 interface (after the first N CAS bit locations) are mapped to the first M CAS bit locations for the second fractional E1 interface. As would be appreciated by one of ordinary skill in the art upon reading this specification, time slot 16 of frame 0 is not used to communicate CAS signaling bits.

To further illustrate this mapping, when N+M is less than or equal to 15, the STU-C maps the CAS signaling bits for the first N user-data timeslots from the first four bits of frame 1, time slot 16 to the first four bits of the first STU-R's frame 1, time slot 16. STU-C further maps the CAS signaling bits from the first four bits of frame 2, time slot 16 of its G.703/E1 interface to the first four bits of the first STU-R's frame 2, time slot 16, and so on up through the N'th frame. For the next M timeslots of user-data, STU-C maps the CAS signaling bits from the first four bits of frame N+1, time slot 16 to the first four bits of the second STU-R's frame 1, time slot 16, the first four bits of frame N+2, time slot 16 of its G.703/E1 interface to the first four bits of the second STU-R's frame 2, time slot 16, and so on up through the M'th frame.

When N is greater than or equal to 15, timeslots allocated to the second STU-R's G.703/E1 interface include timeslots N+2 to N+M+1 on the STU-C G.703 interface. In that case, signaling bits for the first 15 user-data time slots for the STU-C interface are respectively mapped into the first four bits of time slot 16 of frames 1 to 15 of the first STU-R. Signaling bits for the next N-15 user-data time slots for the STU-C interface are respectively mapped from the second four bits of timeslot 16 of frames 1 to N-15 of the STU-C to the second four bits of time slot 16 of frames 1 to N-15 of the first STU-R. Signaling bits for the remaining M time slots of user-data for the STU-C interface are mapped from the second four bits from timeslot 16 of frames N-14 to M+N-15 of the STU-C to the first four bits of time slot 16 of frames 1 to M of the second STU-R.

When N is less than 15 and N+M is greater than 15, the second STU-R's G.703/E1 interface is allocated timeslots N+1 to 15, and timeslots 17 to N+M+1 on the STU-C G.703 interface. In that case, signaling bits for the first N user-data time slots for the STU-C G.703/E1 interface are respectively mapped to the first four bits of time slot 16 of frames 1 to N of the first STU-R. Signaling bits for the next 15-N time slots of user-data for the STU-C G.703/E1 interface are mapped from the first four bits of timeslot 16 of frames N+1 to 15 of the STU-C to the first four bits of time slot 16 of frames 1 to 15-N of the second STU-R. When M is less than 16, signaling bits for the remaining time slots of user-data for the STU-C G.703/E1 interface are mapped from the second four bits of timeslot 16 of frames 1 to M+N-15 of the STU-C to the first four bits of time slot 16 of frames 16-N to M of the second STU-R. When M is not less than 16, the first 15 signaling bits are mapped as described in the preceding sentence, while any remaining signaling bits are mapped to the second four bits of time slot 16 of frames 1 to M-15 of the second STU-R.

Figure 4:
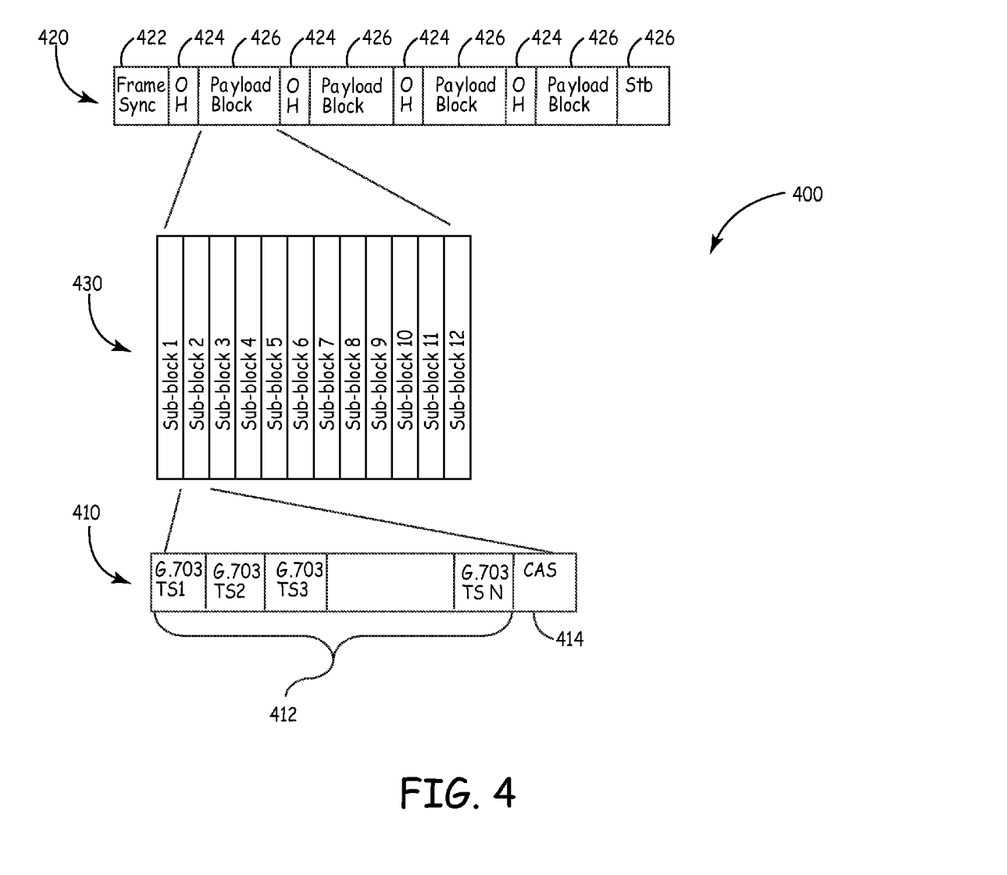
FIG. 4 is a diagram illustrating timeslot mapping onto a DSL framework for a communication network of one embodiment of the present invention.

As taught above, a single G.703/E1 interface at an STU-C with an active CAS signaling channel can be used to create two fractional G.703/E1 interfaces at a first STU-R and a second STU-R, each with a dedicated CAS signaling channel FIG. 4 is a diagram (shown generally at 400) illustrating timeslot mapping onto DSL communications links used to carry a fractional G.703/E1 line between an STU-C and an STU-R of one embodiment of the present invention. A DSL frame structure (shown generally at 420) comprises a frame sync data block 422 followed by a plurality of alternating overhead data blocks 424 and payload blocks 426 until the end of the DSL frame 420 (indicated by the Stb block at 428). Each payload block 426 further comprises 12 sub-blocks (shown generally at 430) each carrying one frame of G.703/E1 timeslots (shown generally at 410). Assuming each frame carries N user-data timeslots (shown at 412) within each sub-block 430, the N user-data timeslots 412 are rearranged so that the CAS signaling bits carried in timeslot 16 occupy the last timeslot (shown at 414) of the payload block 426.

Figure 5:
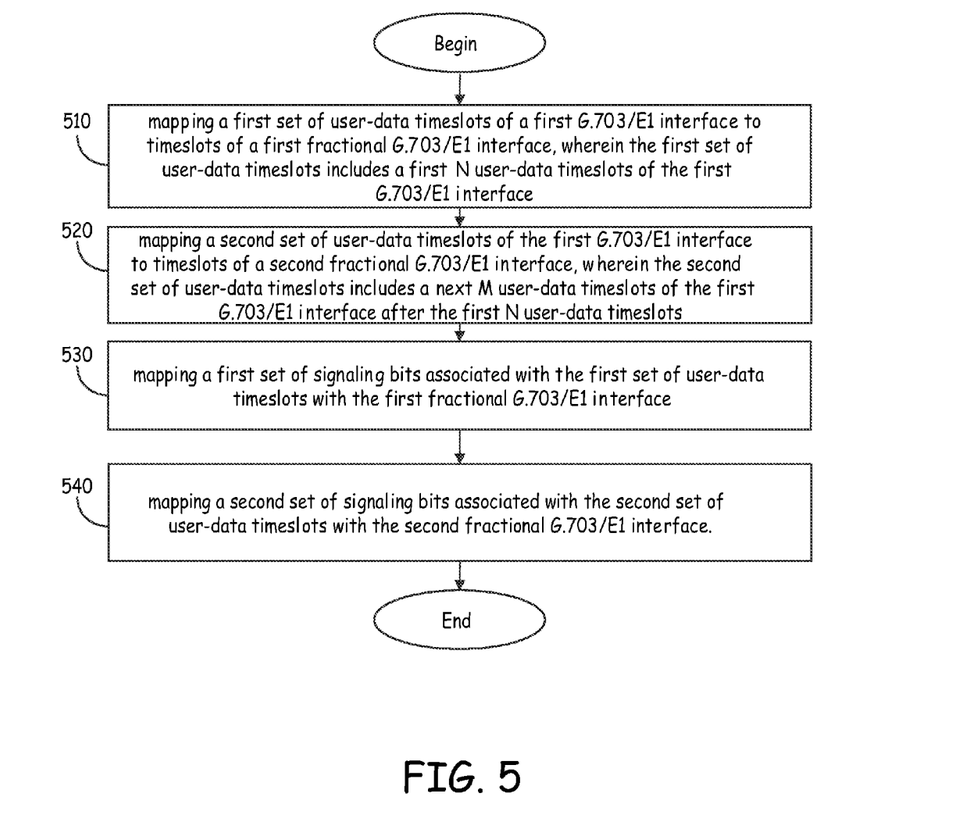
FIG. 5 is a flow chart illustrating a method of one embodiment of the present invention.

FIG. 5 is a flow chart illustrating a method for providing point-to-multipoint communication with CAS signaling. The method begins at 510 with mapping a first set of user-data timeslots of a first G.703/E1 interface to timeslots of a first fractional G.703/E1 interface, wherein the first set of user-data timeslots includes a first N user-data timeslots of the first G.703/E1 interface. Then method proceeds to 520 with mapping a second set of user-data timeslots of the first G.703/E1 interface to timeslots of a second fractional G.703/E1 interface, wherein the second set of user-data timeslots includes a next M user-data timeslots of the first G.703/E1 interface after the first N user-data timeslots.

As previously discussed, a G.703/E1 frame of data includes up to a total of 32 timeslots, wherein timeslots 0 and 16 are reserved. This leaves timeslots 1 to 15 and 17 to 31 of an G.703/E1 interface available for use to carry user-data. Timeslots 1 to 15 and 17 to 31 are therefore referred to in this specification as the "user-data timeslots". The 30 user-data timeslots available in a full E1 frame are also frequently referred to as telephone channels 1 to 30. Mapping the first N user-data timeslots to a first fractional G.703/E1 interface means that user-data carried in the first N user-data timeslots of the first G.703/E1 interface is carried in the N timeslots of the first fractional G.703/E1 data link Similarly, the next M user-data timeslots of the first G.703/E1 interface are carried in the M timeslots of the second fractional G.703/E1 interface In one embodiment, when N is less than 16, the method maps timeslots 1 to N of the first fractional G.703/E1 interface with respective timeslots 1 to N of the first G.703/E1 interface. In an alternate embodiment, when N is greater than 16, the method maps user-data timeslots 1 to N of the first fractional G.703/E1 interface with respective timeslots 1 to 15 and 17 to N+1 of the first G.703/E1 interface. User-data is not mapped to or from timeslot 16 because timeslot 16 is reserved for carrying CAS signaling bits rather than user-data.

In one embodiment, when N+M is less than 16, the method maps timeslots 1 to M of the second fractional G.703/E1 interface with respective timeslots N+1 to N+M of the first G.703/E1 interface. In an alternate embodiment, when N is greater than 15, the method maps timeslots 1 to M of the second fractional G.703/E1 interface with respective timeslots N+2 to N+M+1 of the first G.703/E1 interface. In one embodiment, when N is less than 15 and N+M is greater than 15, the method maps the first M user-data timeslots of the second fractional G.703/E1 interface with respective timeslots N+1 to 15 and 17 to N+M+1 of the first G.703/E1 interface. Again, user-data is not mapped to or from timeslot 16.

To provide the first and second fractional G.703/E1 interfaces each with a dedicated CAS signaling channel, the method further maps CAS signaling bits between timeslot 16 of frames 1-15 of the first 0.703/E1 interface and timeslot 16 of frames 1-15 for the first and second fractional 0.703/E1 interfaces. The method thus proceeds to 530 with mapping a first set of signaling bits associated with the first set of user-data timeslots with the first fractional G.703/E1 interface. The method further proceeds to 540 with mapping a second set of signaling bits associated with the second set of user-data timeslots with the second fractional G.703/E1 interface.

In one embodiment, CAS bit locations 1 to N of the first G.703/E1 interface are mapped to the first N CAS bit locations for the first fractional G.703/E1 interface. Similarly, to map the CAS signaling bits of the next M user-data timeslots from the first G.703/E1 interface to the second fractional G.703/E1 interface, CAS bit locations N+1 to M of the first G.703/E1 interface are mapped to the first M CAS bit locations for the second fractional G.703/E1 interface.

Although embodiments described in this specification discuss the present invention in terms of network interfaces that utilize G.703/E1 standards, one of ordinary skill in the art would appreciate that embodiments of the present invention are not so limited, but also apply to other network interface standards.

Several means are available to implement the systems and methods of the current invention as discussed in this specification. These means include, but are not limited to, digital computer systems, microprocessors, programmable controllers and field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system comprising:
   a first line unit having a first network interface, where the first line unit is configured to communicate via the first network interface using a first frame structure comprising a plurality of timeslots, the first frame structure transporting signaling bits in an x'th timeslot reserved for signaling;
   a second line unit coupled to the first line unit, the second line unit having a second network interface allocated a first portion of bandwidth of the first network interface, where the second line unit is configured to communicate using a second frame structure comprising a plurality of timeslots via the second network interface, the second frame structure transporting signaling bits via its x'th timeslot;
   a third line unit coupled to the first line unit, the third line unit having a third network interface allocated a second portion of bandwidth of the first network interface, where the third line unit is configured to communicate using a third frame structure comprising a plurality of timeslots via the third network interface, the third frame structure transporting signaling bits via its x'th timeslot;
   wherein for each frame communicated via the first network interface, at least one payload timeslot in the first frame structure is uniquely mapped to either the second frame structure or the third frame structure;
   wherein the x'th timeslot for each of the first frame structure, the second frame structure and the third frame structure is formatted in a multiframe structure, wherein the multiframe structure comprises a schedule of signaling bit locations each allocated to signaling bits corresponding to a designated payload timeslot;
   wherein when the first line unit communicates to the second line unit a first set of signaling bits for a first payload timeslot within the first frame structure, the second line unit identifies a second payload timeslot within the second frame structure that is mapped to the first payload timeslot, and retransmits the first set of signaling bits during the x'th timeslot of a frame scheduled for signaling bit locations corresponding to the second payload timeslot as scheduled per the multiframe structure; and
   wherein when the first line unit communicates to the third line unit a second set of signaling bits for a third payload timeslot within the first frame structure, the second line unit identifies a fourth payload timeslot within the second frame structure that is mapped to the third payload timeslot, and retransmits the second set of signaling bits during the x'th timeslot of a frame scheduled for signaling bit locations corresponding to the fourth payload timeslot as scheduled per the multiframe structure.

2. The system of claim 1, wherein when the second line unit communicates to the first line unit a third set of signaling bits for a fifth payload timeslot within the second frame structure, the first line unit identifies a sixth payload timeslot within the first frame structure that is mapped to the fifth payload timeslot, and retransmits the third set of signaling bits during the x'th timeslot of a frame scheduled for signaling bit locations corresponding to the sixth payload timeslot as schedule per the multiframe structure.

3. The system of claim 1, wherein the multiframe structure comprises 16 frames.

4. The system of claim 3, wherein for each frame of the multiframe structure, signaling bit locations are allocated for two payload timeslots.

5. The system of claim 1, wherein for each frame communicated via the first network interface, each payload timeslot in the first frame structure is uniquely mapped with either a payload timeslot of the second frame structure or a payload timeslot of the third frame structure.

6. The system of claim 1, wherein the first line unit is coupled to the second line unit by a DSL communication link.

7. The system of claim 1, wherein the first line unit is coupled to the second line unit by a first loop of a G.SHDSK communication link; and
   wherein the first line unit is coupled to the third line unit by a second loop of a G.SHDSK communication link.

8. The system of claim 1, wherein the first frame structure, the second frame structure and the third frame structure are G.703/E1 standard.

9. The system of claim 1, wherein the second network interface and the third network interface are fractional network interfaces.

10. A system comprising:
 a primary line unit having a first network interface, where the first line unit is configured to communicate via the first network interface using a first frame structure comprising a plurality of timeslots, the first frame structure transporting signaling bits in an x'th timeslot reserved for signaling;
 a plurality of secondary line units coupled to the first line unit, the plurality of secondary line units each allocated a fraction of the bandwidth of the first network interface;
 wherein for each frame communicated via the first network interface, each payload timeslot in the first frame structure is uniquely mapped with one payload timeslot communicated by one of the plurality of secondary line units;
 wherein a first secondary line unit of the plurality of secondary line is configured to communicate via a second network interface using a second frame structure that includes a plurality of timeslots, the second frame structure transporting signaling bits via its x'th timeslot;
 wherein the x'th timeslot for each of the first frame structure and the second frame structure is formatted in a multiframe structure, wherein the multiframe structure comprises a schedule of signaling bit locations each allocated to signaling bits corresponding to a designated payload timeslot; and
 wherein when the primary line unit communicates to the first secondary line unit a first set of signaling bits for a first payload timeslot within the first frame structure, the first secondary line unit identifies a second payload timeslot within the second frame structure that is mapped to the first payload timeslot, and schedules retransmission of the first set of signaling bits for the x'th timeslot of a frame scheduled for signaling bit locations corresponding to the second payload timeslot as scheduled per the multiframe structure.

11. The system of claim 10, wherein when the first secondary line unit communicates to the primary line unit a second set of signaling bits for a third payload timeslot within the second frame structure, the primary line unit identifies a fourth payload timeslot within the first frame structure that is mapped to the third payload timeslot, and retransmits the second set of signaling bits during the x'th timeslot of a frame scheduled for signaling bit locations corresponding to the fourth payload timeslot as schedule per the multiframe structure.

12. The system of claim 10, wherein the multiframe structure comprises 16 frames.

13. The system of claim 10, wherein for each frame of the multiframe structure, signaling bit locations are allocated for two payload timeslots.

14. The system of claim 10, wherein the first line unit is coupled to the first secondary line unit by a DSL communication link.

15. The system of claim 10, wherein the first line unit is coupled to the first second line unit by a first loop of a G.SHDSK communication link.

16. The system of claim 10, wherein the first frame structure and the second frame structure are formatted based on the G.703/E1 standard.

17. The system of claim 10, wherein the second network interface is a fractional network interface.

18. A line unit comprising:
 a first network interface to communicate with a first network node using a first frame structure comprising a plurality of timeslots, the first frame structure transporting signaling bits in an x'th timeslot reserved for signaling;
 the first line unit further coupled to at least one other line unit via a communication link, wherein the at least one other line unit is configured to communicate with a second network node using a second frame structure comprising a plurality of timeslots, the second frame structure transporting signaling bits via its x'th timeslot;
 wherein payload timeslots for a first frame received from the at least one other line unit are mapped from the second frame structure to payload timeslots of a second frame using the first frame structure and transmitted via the first network interface;
 wherein the x'th timeslot for each of the first frame structure and the second frame structure is formatted in a multiframe structure, wherein the multiframe structure comprises a schedule of signaling bit locations each allocated to signaling bits corresponding to a designated payload timeslot; and
 wherein when the first line unit receives from the at least one other line unit a first set of signaling bits for a first payload timeslot within the second frame structure, based on where in the first frame structure the first payload timeslot is mapped to a second payload timeslot, the first line unit schedules retransmission of the first set of signaling bits for the x'th timeslot of a frame scheduled for signaling bit locations corresponding to the second payload timeslot as scheduled according to the multiframe structure.

19. The line unit of claim 18, wherein the first line unit is coupled to the at least one other line unit by a DSL communication link; and
 wherein the first frame structure and the second frame structure are G.703/E1 standard frame structures.

20. The line unit of claim 18, wherein the first line unit is linked to a plurality of other line units by the DSL communication link.

* * * * *